(12) United States Patent
Sugiura et al.

(10) Patent No.: US 8,116,952 B2
(45) Date of Patent: Feb. 14, 2012

(54) CONTROL SYSTEM FOR AUTOMATIC TRANSMISSION

(75) Inventors: Tadashi Sugiura, Anjo (JP); Yosuke Takei, Anjo (JP); Hideaki Ogasawara, Anjo (JP); Hiroshi Tsutsui, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 556 days.

(21) Appl. No.: 12/314,822

(22) Filed: Dec. 17, 2008

(65) Prior Publication Data

US 2009/0171541 A1  Jul. 2, 2009

(30) Foreign Application Priority Data

Dec. 27, 2007  (JP) ................... 2007-338149

(51) Int. Cl.
- *F16H 61/02* (2006.01)
- *B60W 10/10* (2006.01)
- *G06F 19/00* (2006.01)

(52) U.S. Cl. ............... 701/51; 701/52; 477/140
(58) Field of Classification Search .............. 701/51, 701/52, 57, 60, 61, 65; 477/140, 97
See application file for complete search history.

(56) References Cited

U.S. PATENT DOCUMENTS

| | | | |
|---|---|---|---|
| 4,905,530 A | 3/1990 | Stehle et al. | |
| 4,987,792 A | 1/1991 | Mueller et al. | |
| 5,044,220 A | 9/1991 | Raff et al. | |
| 5,062,314 A | 11/1991 | Maier et al. | |
| 5,070,740 A | 12/1991 | Giek et al. | |
| 5,823,052 A * | 10/1998 | Nobumoto | 74/335 |
| 5,871,417 A * | 2/1999 | Suzuki | 477/43 |
| 6,059,689 A * | 5/2000 | Shimizu et al. | 477/98 |
| 6,085,139 A * | 7/2000 | Nakauchi et al. | 701/52 |
| 6,514,174 B2 * | 2/2003 | Iida et al. | 477/125 |
| 7,001,307 B2 * | 2/2006 | Matsunaga et al. | 477/118 |
| 7,337,051 B2 * | 2/2008 | Ota et al. | 701/51 |
| 7,933,704 B2 * | 4/2011 | Roudeau et al. | 701/54 |
| 2002/0013650 A1 | 1/2002 | Kusafuka et al. | |
| 2007/0287589 A1* | 12/2007 | Kadono et al. | 477/110 |
| 2008/0153661 A1* | 6/2008 | Shibata et al. | 477/3 |
| 2009/0171539 A1 | 7/2009 | Sugiura et al. | |
| 2009/0171540 A1 | 7/2009 | Sugiura et al. | |
| 2009/0171542 A1 | 7/2009 | Sugiura et al. | |

FOREIGN PATENT DOCUMENTS

| | | |
|---|---|---|
| JP | A-6-241301 | 8/1994 |
| JP | A-10-238626 | 9/1998 |
| JP | A-10-324169 | 12/1998 |
| JP | A-2001-235026 | 8/2001 |

(Continued)

*Primary Examiner* — Tan Q Nguyen
(74) *Attorney, Agent, or Firm* — Oliff & Berridge, PLC

(57) ABSTRACT

A control system for an automatic transmission is provided with a manual shift mode capable of performing a shift command made by manual operation. While in the manual shift mode and during the operation of a downshift command generated by a shift lever, a manual shift control unit calculates a degree of power required by a driver that, for example, takes into consideration an operation intent of the driver and a road condition. A post-downshift shift speed is then determined in accordance with the degree of required power and downshifting performed. By performing only one downshift command through manual operation, downshifting in accordance with the degree of power required by the driver is performed. Downshifting to a shift speed desired by the driver can thus be promptly performed, without the operation becoming a burden.

6 Claims, 6 Drawing Sheets

FOREIGN PATENT DOCUMENTS

| | | |
|---|---|---|
| JP | A-2006-38041 | 2/2006 |
| JP | A 2009-156433 | 7/2009 |
| JP | A 2009-156434 | 7/2009 |
| JP | A 2009-156436 | 7/2009 |

\* cited by examiner

FIG. 2
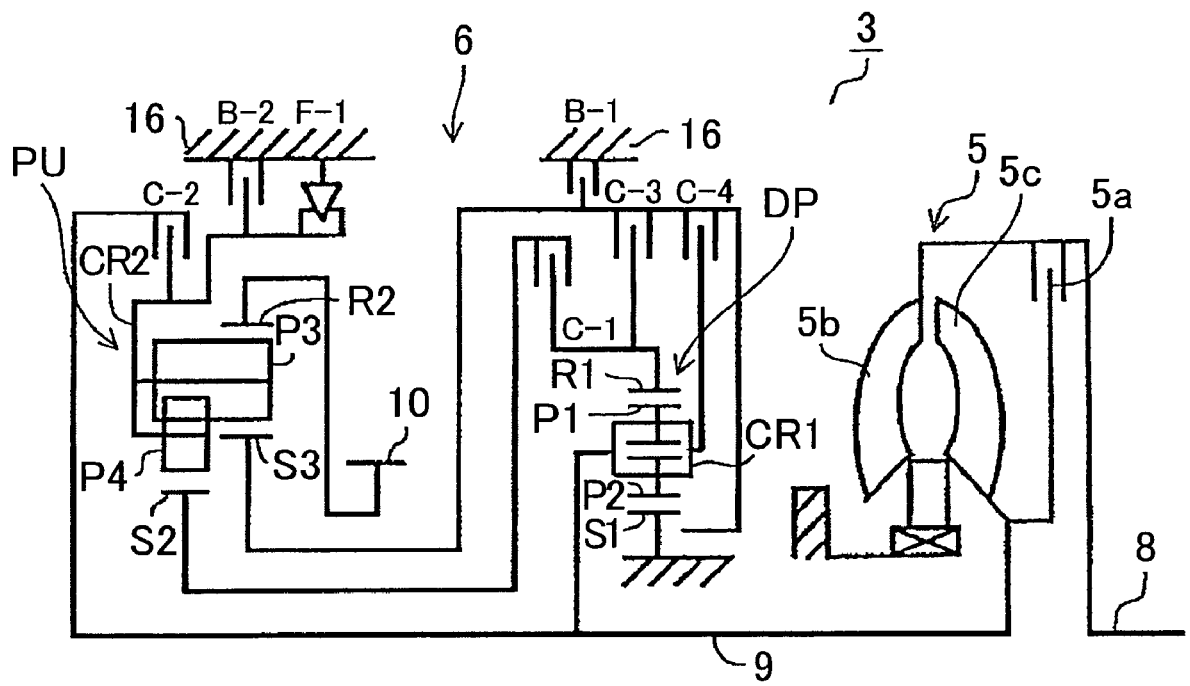
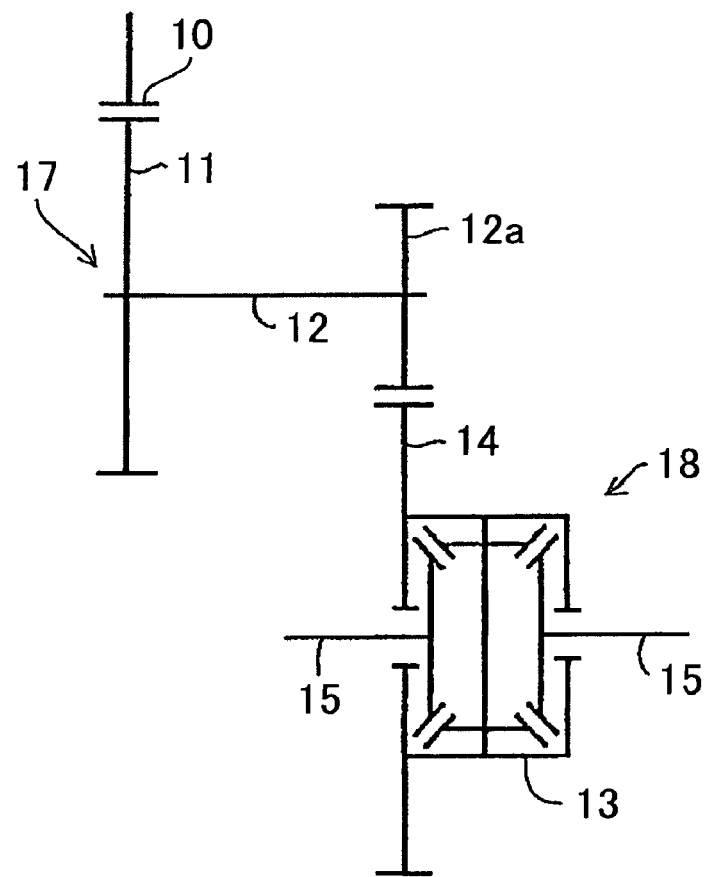

FIG.3

|   | C-1 | C-2 | C-3 | C-4 | B-1 | B-2 | F-1 |
|---|---|---|---|---|---|---|---|
| 1st | ● |   |   |   |   | (●) | ● |
| 2nd | ● |   |   |   | ● |   |   |
| 3rd | ● |   | ● |   |   |   |   |
| 4th | ● |   |   | ● |   |   |   |
| 5th | ● | ● |   |   |   |   |   |
| 6th |   | ● |   | ● |   |   |   |
| 7th |   | ● | ● |   |   |   |   |
| 8th |   | ● |   |   | ● |   |   |
| Rev1 |   |   | ● |   |   | ● |   |
| Rev2 |   |   |   | ● |   | ● |   |

(●): ENGINE BRAKE IN OPERATION

CONTROL SYSTEM FOR AUTOMATIC TRANSMISSION

INCORPORATION BY REFERENCE

The disclosure of Japanese Patent Application No. 2007-338149 filed on Dec. 27, 2007 including the specification, drawings and abstract is incorporated herein by reference in its entirety.

BACKGROUND OF THE INVENTION

1. Field of the Invention

The present invention relates to a control system for an automatic transmission mounted in a vehicle or the like. More specifically, the present invention relates to a control system for an automatic transmission capable of executing an automatic shift mode that performs automatic shifting based on a vehicle running state and also capable of executing a manual shift mode that performs shifting based on a command generated by manual operation.

2. Description of the Related Art

An automatic transmission mounted in a vehicle or the like is structured so as to automatically determine a speed ratio (shift speed) based in particular on an accelerator opening and a vehicle speed while the vehicle is traveling forward, and also achieve travel at a suitable speed ratio without requiring a shift operation from a driver. However, in response to recent demands for sporty driving, finer selection of an engine brake, and the like, a device has been proposed that enables a so-called manual shift operation, where the driver can freely select the speed ratio (shift speed). (See Japanese Patent Application Publication No. JP-A-H10-324169.)

With regard to stepped automatic transmissions in recent years, multi-stage automatic transmissions such as those achieving six or more forward speeds are now becoming mainstream in order to contribute to improved vehicle fuel economy and so forth. Even automatic transmissions that perform stepless shifting such as a belt type CVT now have segmented speed ratios (such as six or more speeds) and are structured so as to enable the selection of pseudo shift speeds.

However, when an automatic transmission is set with its speed ratios (shift speeds) segmented (multi-staged) in this manner, the speed ratio (shift speed) must be changed by, for example, two or three steps in order to attain significant engine braking during such times as downhill driving and sudden braking. Especially in cases where the above manual shift operation is performed, the driver may need to successively perform a number of manual shift operations in a short time. Such operations become a burden, leading to the problem of poor vehicle drivability.

When performing the above manual shift operation, the burden of the operation can conceivably be reduced with a configuration where a multi-stage change command can be performed by continuously pressing an operation lever or the like to a downshift command position, that is, by a so-called holding operation. However, considering a holding time for determination that must be set to ensure an erroneous operation or the like is not made, the shift command takes longer to complete and results in a poor response particularly ill-suited for sporty driving. In addition, the shift command ultimately increases one speed at a time, i.e., the automatic transmission is shifted one speed at a time, for example, from sixth speed to fifth to fourth and then to third. As a consequence, shifting is performed in succession and leads to the problem of poor drivability.

SUMMARY OF THE INVENTION

Hence, it is an object of the present invention to provide a control system for an automatic transmission that, when performing an operation of a downshift command generated by a manual operating unit, is capable of promptly downshifting to a speed ratio desired by a driver, without the operation becoming a burden.

The present invention (see FIGS. 1 to 6, for example) is a control system for an automatic transmission capable of executing an automatic shift mode wherein a speed ratio is automatically selected based on a running state of a vehicle (e.g. an accelerator opening and a vehicle speed), and executing a manual shift mode wherein the speed ratio is changed based on an upshift command (e.g. (+)) and a downshift command (e.g. (−)) generated by manual operation of the manual operating unit. The control system includes: a required power degree calculating unit for calculating a degree of power required by the driver based on a driving operation; and a manual shift control unit that includes a required power degree reflecting unit for changing and setting a post-downshift speed ratio in accordance with the degree of power required, and that performs downshifting to the changed and set speed ratio while in the manual shift mode and during an operation of the downshift command generated by the manual operating unit.

Accordingly, while in the manual shift mode and during the operation of the downshift command generated by the manual operating unit, the required power degree reflecting unit changes and sets a post-downshift speed ratio corresponding to the degree of power required by the driver, and downshifting is performed to the changed and set speed ratio. Therefore, the single operation of the downshift command generated by the manual operating unit enables downshifting that corresponds to the degree of power required by the driver. In other words, prompt downshifting to the speed ratio desired by the driver can thus be achieved without the operation becoming a burden.

In the present invention (see FIG. 1 and FIGS. 4 to 6, for example), the required power degree reflecting unit changes and sets the post-downshift speed ratio such that a speed ratio difference before and after downshifting increases as the degree of power required increases.

Accordingly, the required power degree reflecting unit changes and sets the post-downshift speed ratio such that there is a greater difference between the speed ratio before and after downshifting as the degree of power required increases. Therefore, downshifting can be performed so as to increase a driving force and engine braking when the driver requires a large degree of power, and also performed so as to decrease the driving force and engine braking when the driver requires a small degree of power. Prompt downshifting to the speed ratio desired by the driver can thus be achieved.

Specifically, in the present invention (see FIGS. 1 to 6, for example), the required power degree calculating unit calculates the degree of power required based on a vehicle speed, an accelerator opening change speed, and an accelerator opening in a predetermined time.

Accordingly, the required power degree calculating unit calculates the degree of power required based on the vehicle speed, the accelerator opening change speed, and the accelerator opening in a predetermined time. Therefore, the degree of power required by the driver can be accurately calculated in consideration of the operation intent of the driver, the road condition, and the like. Accordingly, downshifting by manual operation corresponding to the degree of power required by the driver can be accurately performed.

More specifically, the present invention (see FIGS. 1 to 5, for example) further includes a required power degree reflecting map in which a post-downshift speed ratio corresponding to the degree of power required and the vehicle speed is stored in advance for each pre-downshift speed ratio.

Accordingly, the required power degree reflecting map in which the post-downshift speed ratio corresponding to the required power degree and the vehicle speed is stored in advance is provided for each pre-downshift shift speed ratio. There is thus no need to perform a complex computation for downshifting by manual operation, and downshifting in line with the degree of power required by the driver can be promptly performed. Since the vehicle speed can be reflected on the post-downshift speed ratio, it is possible to generate an accurate magnitude of driving force and engine braking required depending on the vehicle speed. Accordingly, drivability can be improved while also securing safe travel during downshifting by manual operation.

In the present invention (see FIGS. 2 and 3, for example), the automatic transmission includes a multi-stage automatic transmission that achieves a plurality of shift speeds (e.g. eight forward speeds) by changing a power transmission route of a speed change gear mechanism, and the manual shift control unit changes and sets the post-downshift speed ratio by changing and setting a number of shift speeds to be downshifted based on one downshift command, in accordance with the degree of power required by the driver.

Accordingly, the automatic transmission includes a multistage automatic transmission that achieves a plurality of shift speeds by changing a power transmission route of a speed change gear mechanism, and the manual shift control unit changes and sets the post-downshift speed ratio by changing and setting a number of shift speeds to be downshifted based on one downshift command, in accordance with the degree of power required by the driver. By performing the operation of only one downshift command using the manual operating unit, downshifting to a shift speed in accordance with the degree of power required by the driver can be performed. In other words, downshifting to a shift speed desired by the driver can be promptly performed, without the operation becoming a burden.

Note that the above reference numerals in parentheses are used to reference the drawings and to aid in understanding the invention, but do not exert any influence on the structure described in the claims.

BRIEF DESCRIPTION OF THE DRAWINGS

FIG. 2 is a skeleton diagram showing an automatic transmission to which the present invention is applicable;

FIG. 3 is an engagement chart of the automatic transmission according to the present invention;

FIG. 5 shows drawings of maps reflecting a required power degree, where

DETAILED DESCRIPTION OF THE PREFERRED EMBODIMENTS

Figure 1:
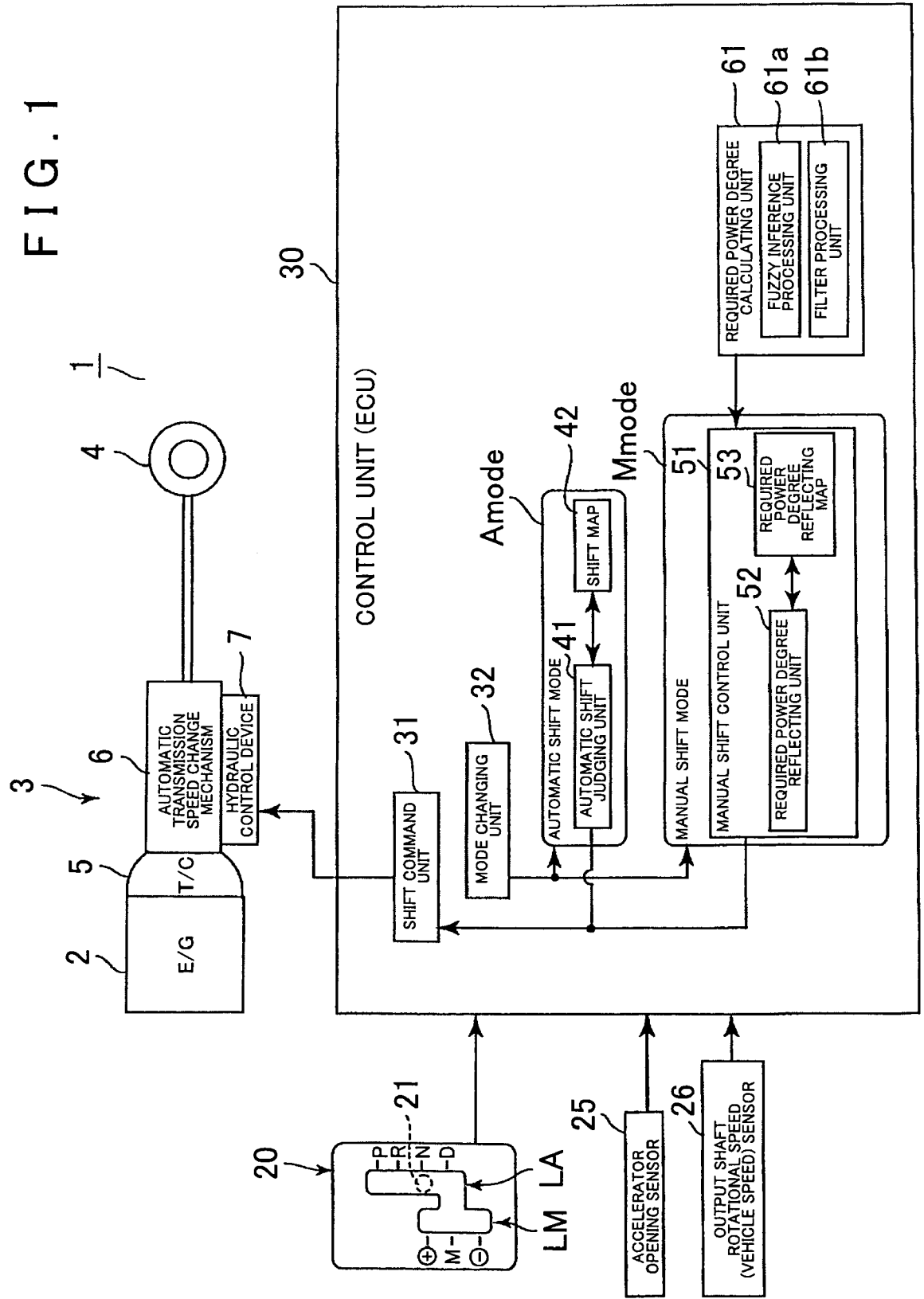
FIG. 1 is a block diagram showing a control system for an automatic transmission according to the present invention.

Embodiments of the present invention will be described below with reference to FIGS. 1 to 6. First, a schematic structure of an automatic transmission 3 to which the present invention is applicable will be described mainly with reference to FIG. 2. As illustrated in FIG. 1, the automatic transmission 3 is provided interposed between an engine (E/G) 2 and a drive wheel 4, and in broad terms is structured including a torque converter (T/C) 5, an automatic speed change mechanism (a speed change gear mechanism) 6, and a hydraulic control device 7.

As illustrated in FIG. 2, the automatic transmission 3 is well suited for use in an FF type (front engine, front wheel drive) vehicle, and has an input shaft 8 whereby the automatic transmission 3 can be connected to the engine 2 (see FIG. 1). The torque converter 5 is connected with the input shaft 8, and has a pump impeller 5$b$ interlocked with the input shaft 8, and a turbine runner 5$c$ to which the rotation of the pump impeller 5$b$ is transmitted via a working fluid. The turbine runner 5$c$ is connected with an input shaft 9 of the automatic speed change mechanism 6, which is coaxially disposed with the input shaft 8. Also, the torque converter 5 is provided with a lock-up clutch 5$a$. Engagement of the lock-up clutch 5$a$ by a hydraulic control of the hydraulic control device 7 (see FIG. 1) directly transmits the rotation of the input shaft 8 of the automatic transmission 3 to the input shaft 9 of the automatic speed change mechanism 6.

The automatic speed change mechanism 6 is provided with the planetary gear DP and the planetary gear unit PU, which are both on the input shaft 9. The planetary gear DP is a so-called double pinion planetary gear, which is provided with a sun gear S1, a carrier CR1, and a ring gear R1, wherein the carrier CR1 meshes with both a pinion P2 that meshes with the sun gear S1 and a pinion P1 that meshes with the ring gear R1.

Meanwhile, the planetary gear unit PU is a so-called Ravigneaux type planetary gear, which is provided with a sun gear S2, a sun gear S3, a carrier CR2, and a ring gear R2, wherein the carrier CR2 meshes with both a long pinion P3 that meshes with the sun gear S3 and the ring gear R2, and a short pinion P4 that meshes with the sun gear S2.

The sun gear S1 of the planetary gear GP is integrally fixed to a case 16. The carrier CR1 is connected with the input shaft 9, with the rotation of the carrier CR1 (referred to as an input rotation below) is identical to the rotation of the input shaft 9, and also connected with a clutch C-4. Due to the stationary sun gear S1 and the input rotation of the carrier CR1, the input rotation of the ring gear R1 is a decelerated rotation that has been reduced in speed. Also, the ring gear R1 is connected with a clutch C-1 and a clutch C-3.

In the planetary gear unit PU, the sun gear S3 is connected with a brake B-1 and fixable with respect to the case 16. The sun gear S3 is also connected with the clutch C-4 and the clutch C-3. Both the input rotation of the carrier CR1 and the decelerated rotation of the ring gear R1 can be input to the sun gear S3 via the clutch C-4 and the clutch C-3, respectively. The sun gear S2 is connected with the clutch C-1, and the decelerated rotation of the ring gear R1 can be input thereto.

Furthermore, the carrier CR2 is connected with a clutch C-2 to which the rotation of the input shaft 9 is input, and such input rotation can be input to the carrier CR2 via the clutch C-2. The carrier CR2 is also connected with a one-way clutch F-1 and a brake B-2. The one-way clutch F-1 regulates the rotation of the carrier CR2 in one direction with respect to the case 16, while the brake B-2 is capable of stopping the rotation of the carrier CR2. The ring gear R2 is connected with a counter gear 10, which is rotatably supported with respect to a center support member (not shown) that is fixed with respect to the case 16, for example.

The counter gear 10 meshes with a large diameter gear 11 that is fixedly disposed on an end of a counter shaft 12 of a counter shaft portion 17. A small diameter gear 12a fixedly disposed on another end of the counter shaft 12 meshes with a gear 14 of a differential portion 18. The gear 14 is interlocked with a differential gear 13, and is connected with right and left axles (output shafts) 15, 15 via the differential gear 13 in a manner that enables absorption of a right-left difference rotation.

Based on the above structure, the operation of the automatic transmission 3 will be explained next with reference to FIGS. 2 and 3.

For a D (drive) range, for example, in a first forward speed (1st), the clutch C-1 and the one-way clutch F-1 are engaged, as shown in FIG. 3. Accordingly, as FIG. 2 shows, the rotation of the ring gear R1, which has been reduced in speed by the stationary sun gear S1 and the input rotation of the carrier CR1, is input to the sun gear S2 via the clutch C-1. The rotation of the carrier CR2 is regulated in one direction (a normal rotation direction), i.e., the carrier CR2 is stationary and reverse rotation thereof is prevented. Accordingly, the decelerated rotation input to the sun gear S2 is output to the ring gear R2 via the stationary carrier CR2, and a normal rotation serving as the first forward speed is output from the counter gear 10.

Note that during engine brake operation (during coasting), the brake B-2 is locked to hold the carrier CR2 stationary and prevent the normal rotation of the carrier CR2, thus maintaining the first forward speed state. In the first forward speed, the one-way clutch F-1 prevents the reverse rotation of the carrier CR2 while enabling normal rotation. Therefore, when shifting from a non-driving range to a driving range, for example, the first forward speed can be smoothly achieved through automatic engagement of the one-way clutch F-1.

In a second forward speed (2nd), the clutch C-1 is engaged and the brake B-1 is locked, as shown in FIG. 3. Accordingly, as FIG. 2 shows, the rotation of the ring gear R1, which has been reduced in speed by the stationary sun gear S1 and the input rotation of the carrier CR1, is input to the sun gear S2 via the clutch C-1. The sun gear S3 is held stationary due to locking of the brake B-1. Accordingly, the decelerated rotation of the carrier CR2 is slower than that of the sun gear S2. The decelerated rotation input to the sun gear S2 is output to the ring gear R2 via the carrier CR2, and a normal rotation serving as the second forward speed is output from the counter gear 10.

In a third forward speed (3rd), the clutch C-1 and the clutch C-3 are engaged, as shown in FIG. 3. Accordingly, as FIG. 2 shows, the rotation of the ring gear R1, which has been reduced in speed by the stationary sun gear S1 and the input rotation of the carrier CR1, is input to the sun gear S2 via the clutch C-1. The decelerated rotation of the ring gear R1 is input to the sun gear S3 due to engagement of the clutch C-3. In other words, since the decelerated rotation of the ring gear R1 is input to the sun gear S3 and the sun gear S2, the decelerated rotation of the planetary gear unit PU is transferred in a direct coupling. The decelerated rotation is thus output unchanged to the ring gear R2, and a normal rotation serving as the third forward speed is output from the counter gear 10.

In a fourth forward speed (4th), the clutch C-1 and the clutch C-4 are engaged, as shown in FIG. 3. Accordingly, as FIG. 2 shows, the rotation of the ring gear R1, which has been reduced in speed by the stationary sun gear S1 and the input rotation of the carrier CR1, is input to the sun gear S2 via the clutch C-1. The input rotation of the carrier CR1 is input to the sun gear S3 due to engagement of the clutch C-4. Accordingly, the decelerated rotation of the carrier CR2 is faster than that of the sun gear S2. The decelerated rotation input to the sun gear S2 is output to the ring gear R2 via the carrier CR2, and a normal rotation serving as the fourth forward speed is output from the counter gear 10.

In a fifth forward speed (5th), the clutch C-1 and the clutch C-2 are engaged, as shown in FIG. 3. Accordingly, as FIG. 2 shows, the rotation of the ring gear R1, which has been reduced in speed by the stationary sun gear S1 and the input rotation of the carrier CR1, is input to the sun gear S2 via the clutch C-1. The input rotation is also input to the carrier CR2 due to engagement of the clutch C-2. Accordingly, due to the decelerated rotation input to the sun gear S2 and the input rotation input to the carrier CR2, a decelerated rotation faster than the fourth forward speed is achieved and output to the ring gear R2, and a normal rotation serving as the fifth forward speed is output from the counter gear 10.

In a sixth forward speed (6th), the clutch C-2 and the clutch C-4 are engaged, as shown in FIG. 3. Accordingly, as FIG. 2 shows, the input rotation of the carrier CR1 is input to the sun gear S3 due to engagement of the clutch C-4. The input rotation is also input to the carrier CR2 due to engagement of the clutch C-2. In other words, since the input rotation is input to the sun gear S3 and the carrier CR2, the input rotation of the planetary gear unit PU is transferred in a direct coupling. The input rotation is thus output unchanged to the ring gear R2, and a normal rotation serving as the sixth forward speed is output from the counter gear 10.

In a seventh forward speed (7th), the clutch C-2 and the clutch C-3 are engaged, as shown in FIG. 3. Accordingly, as FIG. 2 shows, the rotation of the ring gear R1, which has been reduced in speed by the stationary sun gear S1 and the input rotation of the carrier CR1, is input to the sun gear S3 via the clutch C-3. The input rotation is also input to the carrier CR2 due to engagement of the clutch C-2. Accordingly, due to the decelerated rotation input to the sun gear S3 and the input rotation input to the carrier CR2, an accelerated rotation slightly faster than the input rotation is achieved and output to the ring gear R2, and a normal rotation serving as the seventh forward speed is output from the counter gear 10.

In an eighth forward speed (8th), the clutch C-2 is engaged and the brake B-1 is locked, as shown in FIG. 3. Accordingly, as FIG. 2 shows, the input rotation of the carrier CR2 is input due to engagement of the clutch C-2. The sun gear S3 is held stationary due to locking of the brake B-1. Accordingly, due to the stationary sun gear S3, the input rotation of the carrier CR2 becomes faster than the seventh forward speed and is output to the ring gear R2, and a normal rotation serving as the eighth forward speed is output from the counter gear 10.

In a first reverse speed (Rev1), the clutch C-3 is engaged and the brake B-2 is locked, as shown in FIG. 3: Accordingly, as FIG. 2 shows, the rotation of the ring gear R1, which has been reduced in speed by the stationary sun gear S1 and the input rotation of the carrier CR1, is input to the sun gear S3 via the clutch C-3. The carrier CR2 is held stationary due to locking of the brake B-2. Accordingly, the decelerated rotation input to the sun gear S3 is output to the ring gear R2 via the stationary carrier CR2, and a reverse rotation serving as the first reverse speed is output from the counter gear 10.

In a second reverse speed (Rev2), the clutch C-4 is engaged and the brake B-2 is locked, as shown in FIG. 3. Accordingly, as FIG. 2 shows, the input rotation of the carrier CR1 is input to the sun gear S3 due to engagement of the clutch C-4. The carrier CR2 is held stationary due to locking of the brake B-2. Accordingly, the input rotation input to the sun gear S3 is output to the ring gear R2 via the stationary carrier CR2, and a reverse rotation serving as the second reverse speed is output from the counter gear 10.

Note that in a P (parking) range and an N (neutral) range, for example, the clutch C-1, the clutch C-2, the clutch C-3, and the clutch C-4 are released. Accordingly, the carrier CR1 and the sun gear S3 are disconnected, the ring gear R1 and the sun gear S3 are disconnected, and the ring gear R1 and the sun gear S2 are disconnected from each other as well. In other words, the planetary gear DP and the planetary gear unit PU are disconnected. The input shaft 9 and the carrier CR2 are also disconnected. Thus, the power transfer between the input shaft 9 and the planetary gear unit PU is disconnected, i.e., the power transfer from the input shaft 9 to the counter gear 10 is disconnected.

The rotation output by the counter gear 10 according to the above first to eighth forward speeds and first and second reverse speeds is further reduced in speed by the large diameter gear 11 and the small diameter gear 12a of the counter shaft 12. Such rotation is than output to the right and left axles 15, 15 via the differential gear 13 while the right-left difference rotation is absorbed and then transmitted to the drive wheel 4.

A control system 1 for an automatic transmission according to the present invention will be described next with reference to FIG. 1 and FIGS. 4 to 6.

As FIG. 1 illustrates, the control system 1 for an automatic transmission according to the present invention includes a control unit (ECU) 30. The control unit 30 is connected with sensors (not shown) of a shift lever portion 20, an accelerator opening sensor 25, an output shaft rotational speed (vehicle speed) sensor 26, and the like, and also connected with solenoid valves (not shown) of the hydraulic control device 7 of the automatic transmission 3.

The control unit 30 is provided with a shift command unit 31, a mode changing unit 32, an automatic shift judging unit 41 for executing an automatic shift mode Amode, a shift map 42, a manual shift control unit 51 for performing a manual shift mode Mmode, and a required power degree calculating unit 61. The manual shift control unit 51 is structured having a required power degree reflecting unit 52 and a required power degree reflecting map 53, while the required power degree calculating unit 61 is structured having a fuzzy inference processing unit 61a and a filter processing unit 61b.

The shift lever portion 20 is disposed in the vicinity of a driver seat, and structured such that a driver can operate a shift lever (a manual operating unit) 21 shown only by a broken line in the figure to select a position thereof. The shift lever portion 20 is structured by disposed a range selection column LA for automatic shifting that only selects the shift range, and a manual shift selection column LM whereby the driver manually instructs the shift speed. Specifically, as is commonly known, by operating a position of a shift lever 21 the range selection column LA can select any of a P-position (parking range position), an R-position (reverse range position), an N-position (neutral range position), and a D-position (drive range position). From the D-position, the shift lever 21 can be moved to the manual shift selection column LM. An M-position (shift fixed position), a plus (+)-range (upshift position), and a minus (−)-position (downshift position) can be selected through operation of the shift lever 21. These positions of the shift lever 21 are detected by sensors at various locations (not shown) and output to the control unit 30. Note that the shift lever 21 is biased toward the M-position by a spring or the like at the (+)-position and the (−)-position, and after operation by the driver the shift lever 21 automatically returns to the M-position.

It should be noted that in the present embodiment, an example is explained in which the manual shift command is performed by the shift lever. However, the present invention is not limited to this; other embodiments are conceivable provided that the manual shift command can be performed, such as one where a steering wheel is provided with an upshift button and a downshift button, and one where a rear surface of the steering wheel is provided with an upshift paddle and a downshift paddle.

In the following description, an example of the present embodiment is explained where the shift speed is fixed when the shift lever is in the M-position. However, this does not limit the present invention, and when in the M-position a speed determined by the upshift command or the downshift command may be used as an upper limit shift speed and automatic shifting performed up to the upper limit shift speed.

When the shift lever 21 in the shift lever portion 20 is operated to select the D-position, the mode changing unit 32 selects the automatic shift mode Amode (when changing from the M-position to the D-position, the manual shift mode Mmode is changed to the automatic shift mode Amode). In response, the automatic shift judging unit 41 performs automatic shift while referring to the shift map 42, which is based on an accelerator opening TH detected by the accelerator opening sensor 25 and a vehicle speed V detected by the output shaft rotational speed sensor 26. Namely, the shift map 42 records an upshift speed change line and a downshift speed change line (shift point) corresponding to the accelerator opening TH and the vehicle speed V. If the accelerator opening TH and the vehicle speed V at such time exceed the speed change lines, then the automatic shift judging unit 41 determines that shifting is to be performed. If the automatic shift judging unit 41 determines shifting, then in response the shift command unit 31 controls a solenoid valve (not shown) of the hydraulic control device 7 through an electrical command such that the determined shift speed is achieved, whereby the automatic transmission 3 is set to the state of the determined shift speed.

When the shift lever 21 in the shift lever portion 20 is operated to select (change) from the D-position to the M-position, the mode changing unit 32 selects the manual shift mode Mmode (the automatic shift mode Amode is changed to the manual shift mode Mmode). Accordingly, every time the shift lever 21 is operated to the (−)-position, the manual shift control unit 51 considers each of these operations a downshift command. More specifically, the manual shift control unit 51 determines downshifting that reflects an operation intent of the driver (described later). On the other hand, every time the shift lever 21 is operated to the (+)-position, the manual shift control unit 51 considers each of these operations an upshift command and determines an upshift of one speed. In this manner, if an upshift judgment or a downshift judgment is made by the manual shift control unit 51, then similar to the above, the shift command unit 31 controls a solenoid valve (not shown) of the hydraulic control device 7 through an electrical command such that the determined shift speed is achieved, whereby the automatic transmission 3 is set to the state of the determined shift speed.

Note that the manual shift control unit 51 may, for example, communicate a warning tone to the driver seat and void the shift operation of the shift lever 21 by the driver if, based on the accelerator opening TH and the vehicle speed V, there is a problem with the shift speed after shifting, i.e., there is a risk of engine over-revving or engine stop due to shifting. Naturally, manual shift control unit 51 also voids upshifting from the eighth forward speed (highest shift speed) and downshifting from the first forward speed (lower shift speed). In addition, if there is no shift operation of the shift lever 21 by the driver but the vehicle speed V is decreasing and there is a risk of an engine stop, or if maintaining the shift speed unchanged is not desirable, then the manual shift control unit 51 communicates a warning tone to the driver seat and forces shifting to a shift speed that achieves a desired state.

Figure 4:
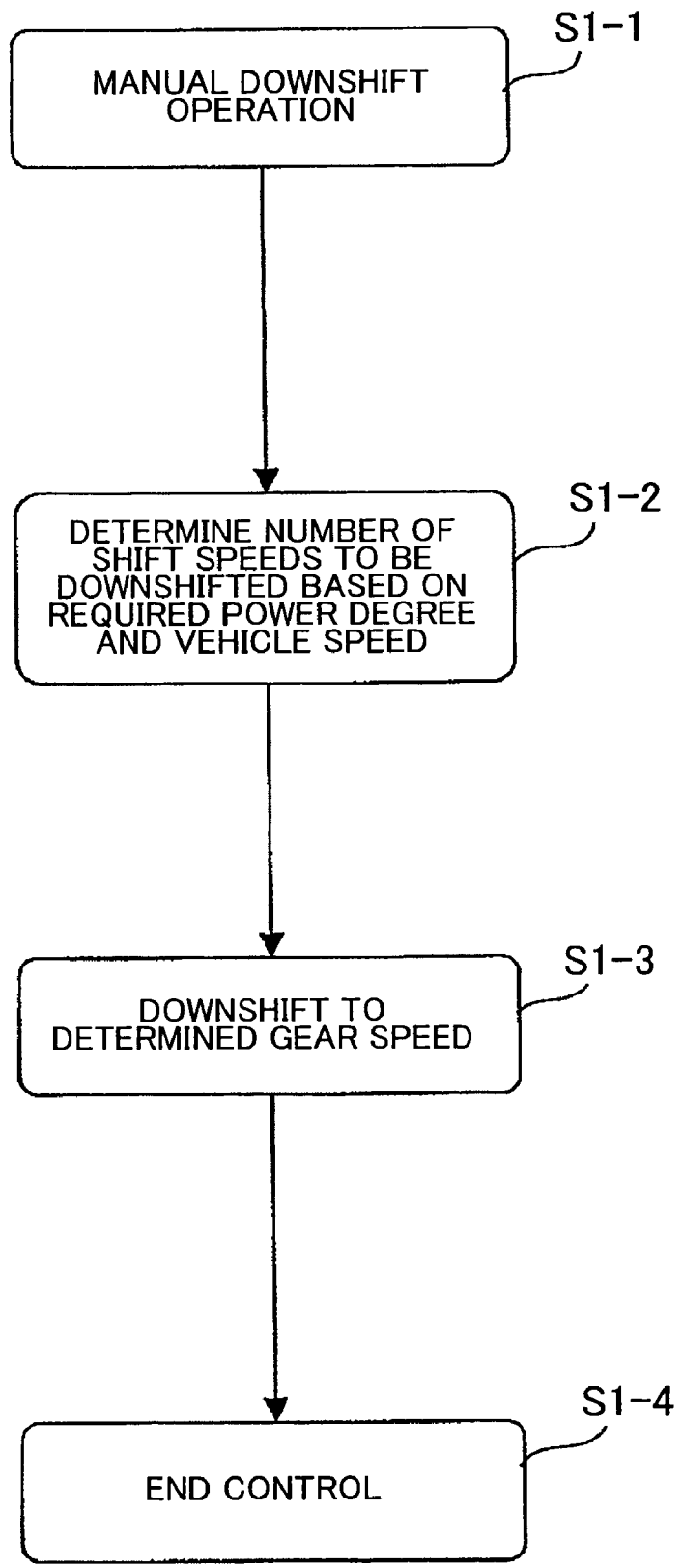
FIG. 4 is a flowchart showing a manual downshift control reflecting a required power degree.

Manual downshifting that takes into consideration an operation intent of the driver and is an essential element of the present invention will be described next using FIGS. 4 to 6 while also referring to FIG. 1.

The calculation (setting) of a required power degree will be explained first based on FIG. 6. For example, in an ignition-ON state (in at least the state of the manual shift mode Mmode), the required power degree calculating unit 61 calculates as needed a required power degree (a degree of power required by the driver) based on the following: the accelerator opening TH detected by the accelerator opening sensor 25, an accelerator opening change speed ΔTH calculated from the accelerator opening TH, and the vehicle speed V detected by the output shaft rotational speed (vehicle speed) sensor 26.

Figure 6:
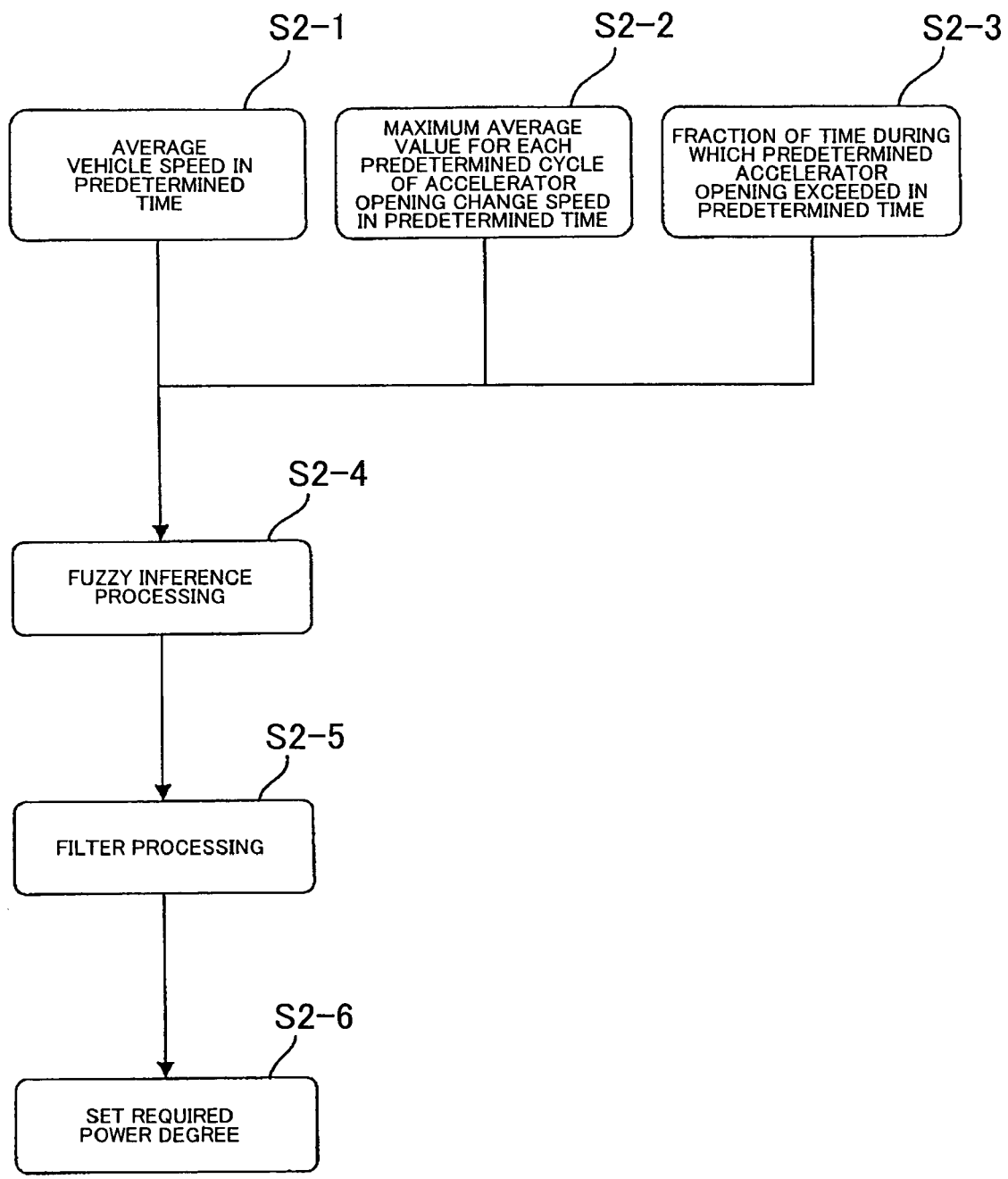
FIG. 6 is a flowchart showing a method for calculating the required power degree.

More specifically, as illustrated in FIG. 6, the required power degree calculating unit 61 calculates an average vehicle speed in a predetermined time (e.g. 30 seconds) (S2-1), and at the same time calculates a maximum average value for each predetermined cycle (e.g. every 3 seconds) of the accelerator opening change speed ΔTH in the predetermined time (S2-2). The required power degree calculating unit 61 also simultaneously calculates a fraction of time during which a predetermined accelerator opening is exceeded in the predetermined time (S2-3).

The routine subsequently proceeds to step S2-4, where the fuzzy inference processing unit 61*a* performs fuzzy inference processing based on three values: the average vehicle speed in the predetermined time (referred to as an average vehicle speed below), a maximum average value for each predetermined cycle of the accelerator opening change speed ΔTH in the predetermined time (referred to as an accelerator opening change value below), and a fraction of time during which a predetermined accelerator opening is exceeded in the predetermined time (referred to as a large opening period below). This fuzzy inference processing is processing that, depending on the above three values, changes and sets the required power degree according to various preset rules. Namely, depending on a road condition (e.g. city and country roads, expressways, mountain roads, and the like) and the operation intent of the driver (for sporty, normal, economy or other driving), the above three values generated by changes are applied to the various rules and the value of the required power degree consequently increased or decreased.

As an example, in the case of a slow average vehicle speed (e.g. less than 60 km/h) and a short large opening period, when the road condition is a city road and the accelerator opening change value is higher than that for a city road used as a reference, the intent of the driver is sporty driving and the required power degree is accordingly increased. On the other hand, in the case of a city road condition where the accelerator opening change value is lower than that for the city road used as a reference, then the intent of the driver is economy driving and the required power degree is accordingly decreased.

As another example, in the case of an intermediate average vehicle speed (e.g. 60 km/h to less than 110 km/h) and a somewhat long large opening period, when the road condition is a country road and the accelerator opening change value is higher than that for a country road used as a reference, the intent of the driver is sporty driving and the required power degree is accordingly increased. On the other hand, in the case of a country road condition where the accelerator opening change value is lower than that for the city road used as a reference, then the intent of the driver is economy driving and the required power degree is accordingly decreased.

As yet another example, in the case of a fast average vehicle speed (e.g. 110 km/h or more), when the road condition is an expressway, the large opening period is long, and the accelerator opening change value is higher than that for an expressway used as a reference, the intent of the driver is sporty driving and the required power degree is accordingly increased. On the other hand, in the case of an expressway road condition where the large opening period is short and the accelerator opening change value is lower than that for the expressway used as a reference, then the intent of the driver is economy driving and the required power degree is accordingly decreased.

As still yet another example, in the case of a slow average vehicle speed (e.g. less than 60 km/h) and a long large opening period, when the road condition is a mountain road and the accelerator opening change value is higher than that for a mountain road used as a reference, the intent of the driver is sporty driving and the required power degree is accordingly increased. On the other hand, in the case of a mountain road condition where the accelerator opening change value is lower than that for the mountain road used as a reference, then the intent of the driver is economy driving and the required power degree is accordingly decreased.

Once the required power degree is changed and set by the fuzzy inference processing in this manner (S2-4), the filter processing unit 61*b* performs filter processing so that the required power degree set by the above fuzzy inference processing has a first order lag.

More specifically, filter processing is performed so that a sudden change contrary to the driver's intent does not occur (S2-5). Namely, the filter is performed so that the value of the required power degree does not suddenly fall when, due to a temporary traffic condition or the like, a transition is made from a state where the driver requires a high degree of power to a driving operation where the required power degree cannot be maintained high, or conversely, so that the value of the required power degree does not suddenly rise when, due to a temporary and necessary acceleration or the like, a transition is made from a state where the driver requires a low degree of power to a driving operation where the required power degree cannot be maintained low.

An example of such a filter is calculation processing where, [current required power degree]=[previous required power degree]×[1−coefficient]+[current required power degree]×[coefficient].

The required power degree calculating unit 61 next sets a result of the fuzzy inference processing by the fuzzy inference processing unit 61*a* and the filter processing by the filter processing unit 61*b* as the required power degree (S2-6). Note that the calculation of the required power degree from step S2-1 to step S2-6 is naturally repeated at a predetermined time interval, and the required power degree is set in a manner where the newest required power degree is adopted each time.

A manual downshift corresponding to the required power degree will be described next with reference to FIGS. 1, 4, and 5. The present control is initiated when the driver operates the shift lever 21 from the D-position to the M-position. For example, during vehicle travel the driver operates the shift lever 21 from the M-position to the (−)-position and a downshift command acting as a manual shift (referred to as a manual downshift below) is input to the control unit 30 (S1-1). In such case, the required power degree reflecting unit 52 then inputs and refers to the required power degree set by the required power degree calculating unit 61 and also refers to the required power degree reflecting map 53 shown in FIG. 5 based on the required power degree and the vehicle speed V.

Figure 5A:
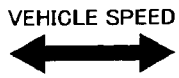
FIG. 5A is a map for eighth speed.
Figure 5B:
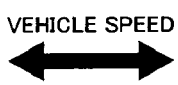
FIG. 5B is a map for seventh speed.
Figure 5C:
FIG. 5C is a map for sixth speed.
Figure 5D:
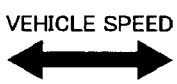
FIG. 5D is a map for fifth speed.
Figure 5E:
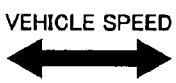
FIG. 5E is a map for fourth speed.

Specifically, the required power degree reflecting unit 52 refers to the map shown in FIG. 5A when the current shift speed (prior to downshifting) is the eighth forward speed, refers to the map shown in FIG. 5B when the current shift speed is the seventh forward speed, refers to the map shown in FIG. 5C when the current shift speed is the sixth forward speed, refers to the map shown in FIG. 5D when the current shift speed is the fifth forward speed, and refers to the map shown in FIG. 5E when the current shift speed is the fourth forward speed. It should be noted that when the current shift speed is a shift speed lower than the third forward speed, there is no need to downshift two or more speeds in consideration of the difference in the transmission gear ratio, and it is naturally impossible to downshift two or more speeds from the second forward speed. Therefore, maps for the first to third forward speeds need not be included in the required power degree reflecting map 53.

The required power degree reflecting map 53 shown in FIGS. 5A to 5E is structured so that as the vehicle speed V (km/h) decreases or the required power degree increases, the number of shift speeds to be downshifted at once increases. The required power degree reflecting map 53 is also structured such that a higher shift speed before downshifting is accompanied by an increased number of shift speeds to be downshifted at once.

By referring to the required power degree reflecting map 53 with the above structure, the required power degree reflecting unit 52 determines (changes and sets) the number of shift speeds to be downshifted (S1-2), and commands the shift command unit 31 to perform downshifting to the shift speed (gear speed) thus determined (S1-3), after which the routine is ended (S1-4).

Note that when the driver operates the shift lever 21 from the M-position to the D-position, then the present control described above is ended and the mode changing unit 32 shifts to the automatic shift mode Amode, i.e., initiates the automatic shift control.

According to the control system 1 of the automatic transmission described above, while in the manual shift mode Mmode and during the operation of the downshift command generated by the shift lever 21, the required power degree reflecting unit 52 changes and sets a post-downshift shift speed corresponding to the required power degree, and the manual shift control unit 51 then performs downshifting to the changed and set shift speed. Therefore, the single operation of the downshift command generated by the shift lever 21 enables downshifting that corresponds to the degree of power required by the driver. Prompt downshifting to the speed ratio desired by the driver can thus be achieved without the operation becoming a burden.

As the required power degree increases, the required power degree reflecting unit 52 changes and sets the post-downshift shift speed such that there is a greater difference between the shift speed before and after downshifting (there is a greater difference between speed ratios). Therefore, manual downshifting can be performed so as to increase the driving force and engine braking when the driver requires a large degree of power, and also performed so as to decrease the driving force and engine braking when the driver requires a small degree of power. Prompt downshifting to the shift speed desired by the driver can thus be achieved.

The required power degree calculating unit 61 calculates the required power degree based on the vehicle speed V, the accelerator opening change speed ΔTH, and the accelerator opening TH in a predetermined time, and more specifically calculates based on the average vehicle speed, the accelerator opening change value, and the large opening period. Therefore, the degree of power required by the driver can be accurately calculated in consideration of the operation intent of the driver, the road condition, and the like. Accordingly, manual downshifting corresponding to the degree of power required by the driver can be accurately performed.

The required power degree reflecting map 53 in which the post-downshift shift speed corresponding to the required power degree and the vehicle speed V is stored in advance is provided for each pre-downshift shift speed. There is thus no need to perform a complex computation for a manual downshift, and downshifting in line with the degree of power required by the driver can be promptly performed. Since the vehicle speed V can be reflected on the post-downshift shift speed, it is possible to generate an accurate magnitude of driving force and engine braking required depending on the vehicle speed V. Accordingly, drivability can be improved while also securing safe travel during a manual downshift.

Note that the embodiment described above applies the control system 1 according to the present invention to a stepped automatic transmission 3 capable of achieving eight forward speeds and two reverse speeds. However, the present invention is not limited to this, and the present invention is naturally applicable to a stepless transmission such as a belt type CVT, for example. For manual downshifting of the stepless transmission, the change speed ratio is changed and set instead of changing and setting the shift speed. In such case, the change speed ratio to be changed in accordance with the degree of power required by the driver can also be set in a stepless fashion in proportion to a segmented degree of required power, for example.

In the present embodiment, the required power degree is accurately calculated by fuzzy inference processing and filter processing. However, the required power degree may be set simply by comparison with a reference value such as the accelerator opening or the vehicle speed. In other words, provided that manual downshifting reflecting the required power degree is performed, any method for calculating the required power degree is within the scope of the present invention.

In the present embodiment, the required power degree was described as a value that takes into consideration an operation intent of the driver and a road condition. However, the required power degree may be calculated using only the operation intent of the driver in particular; namely, a manual downshift performed by changing and setting the post-downshift speed ratio in accordance with the operation intent of the driver is within the scope of the present invention.

In the embodiment described above, the manual downshift command performed once changes and sets the number of shift speeds to be downshifted, and downshifting is performed to the set shift speed. If, for example, the driver sends a plurality of manual downshift commands in succession and the present control executes all of the commands, there is a risk that downshifting beyond the speed ratio intended by the driver will be performed. Therefore, in cases where a plurality of manual downshift commands is given within a predetermined time, the present control may be terminated and downshifting one shift speed at a time performed as normally done. Alternatively, even if a plurality of manual downshift commands is given within a predetermined time, only one (such as only the first one) among the plurality of manual downshift commands may be received.

The control system for an automatic transmission according to the present invention can be used in an automatic transmission mounted in a passenger vehicle, truck, bus, farm machinery, or the like, and is particularly well suited for use where prompt downshifting is required after a manual downshift command is made with respect to a step of a segmented speed ratio.

What is claimed is:

1. A control system for an automatic transmission capable of executing an automatic shift mode wherein a speed ratio is automatically selected based on a running state of a vehicle, and executing a manual shift mode wherein the speed ratio is changed based on an upshift command and a downshift command generated by manual operation of a manual operating unit, the control system comprising:
   a required power degree calculating unit for calculating a degree of power required by a driver based on a driving operation;
   a vehicle speed sensor that detects a vehicle speed;
   a required power degree reflecting map in which a post-downshift speed ratio corresponding to a degree of power required and a vehicle speed is stored in advance for each pre-downshift speed ratio; and
   a manual shift control unit that includes a required power degree reflecting unit for changing and setting a post-downshift speed ratio in accordance with the calculated degree of power required, the detected vehicle speed and the required power degree reflecting map, and that performs downshifting to the changed and set speed ratio while in the manual shift mode and during an operation of the downshift command generated by the manual operating unit.

2. The control system for an automatic transmission according to claim 1, wherein the required power degree reflecting unit changes and sets the post-downshift speed ratio such that a speed ratio difference before and after downshifting increases as the degree of power required increases.

3. The control system for an automatic transmission according to claim 2, wherein the required power degree calculating unit calculates the degree of power required based on the detected vehicle speed, an accelerator opening change speed, and an accelerator opening in a predetermined time.

4. The control system for an automatic transmission according to claim 3, wherein
   the automatic transmission comprises a multi-stage automatic transmission that achieves a plurality of shift speeds by changing a power transmission route of a speed change gear mechanism, and
   the manual shift control unit changes and sets the post-downshift speed ratio by changing and setting a number of shift speeds to be downshifted based on one downshift command, in accordance with the calculated degree of power required by the driver.

5. The control system for an automatic transmission according to claim 1, wherein
   the automatic transmission comprises a multi-stage automatic transmission that achieves a plurality of shift speeds by changing a power transmission route of a speed change gear mechanism, and
   the manual shift control unit changes and sets the post-downshift speed ratio by changing and setting a number of shift speeds to be downshifted based on one downshift command, in accordance with the calculated degree of power required by the driver.

6. The control system for an automatic transmission according to claim 1, wherein the required power degree calculating unit calculates the degree of power required based on the detected vehicle speed, an accelerator opening change speed, and an accelerator opening in a predetermined time.

* * * * *